CLINTON L. GRAYBILL
*INVENTOR.*

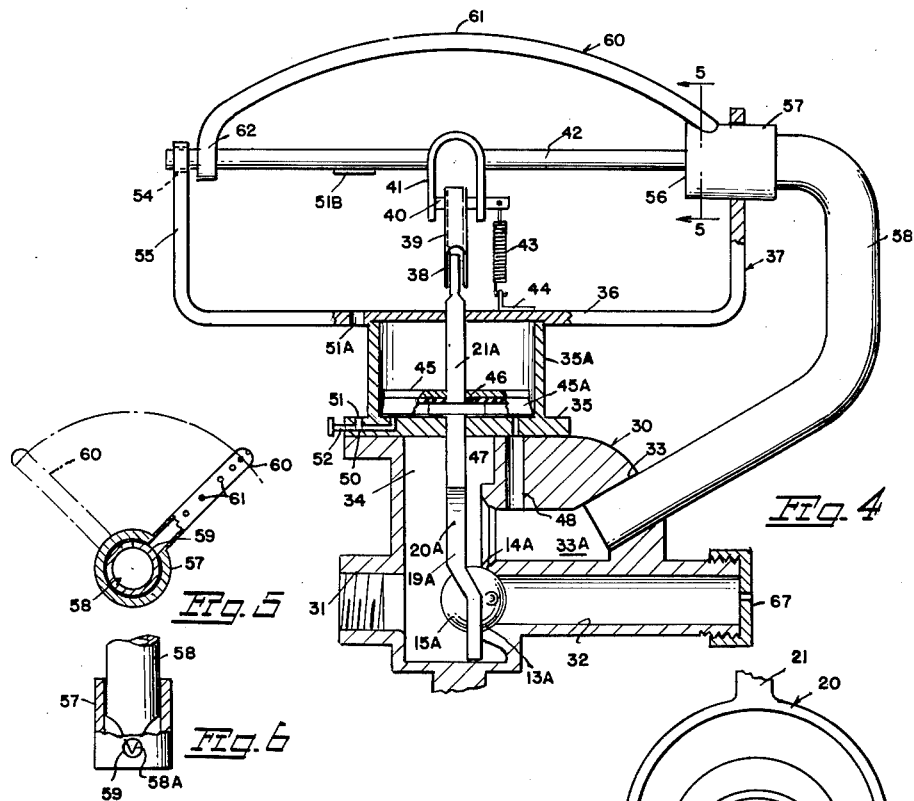

United States Patent Office 3,042,074
Patented July 3, 1962

3,042,074
FLUID DISTRIBUTION SYSTEMS AND CONTROLLING FLUID MOTOR WITH PISTON ACTUATED REVERSING VALVE MEANS
Clinton L. Graybill, Superior, Mont., assignor to Graybill Industries, Inc., Superior, Mont., a corporation of Montana
Filed Jan. 12, 1959, Ser. No. 786,086
1 Claim. (Cl. 137—509)

This invention relates generally to sprinkling systems and more particularly to water distributing control valves and fluid pressure responsive motors for actuating the control valves.

More especially, this invention concerns improvements in water distributing control valves and fluid pressure responsive motors of the type shown and described in my United States Patent No. 2,868,177, dated January 13, 1959, covering Fluid Motor With Piston Actuated Reversing Valve Means.

It is one of the principal objects of the present invention to provide a water distributing control valve adapted to function independently as a unit or in intercommunication with a series of such valves or in conjunction with a master valve singly or in multiple.

Another equally important object of the invention is to provide a fluid pressure responsive motor provided with valve control means operable by fluid pressure from a main line and wherein operation of the motor in turn actuates valve means for controlling the flow of fluid through a branch line and/or diverting it therefrom.

A further object is to provide a valve adapted for alternate valving cooperation with a pair of valve seats for directing water from a source under pressure to separate areas, and a prime mover sensitive to water pressure changes at the source for opposed movements effected by opposed pressure changes, and a delayed motion resilient connector interconnecting the prime mover and the valve for alternately and successively shifting the valve into valving cooperation with the valve seats.

The foregoing and other objects will appear as my invention is more fully hereinafter described in the following specification, illustrated in the accompanying drawings, and finally pointed out in the appended claim.

In the accompanying drawings,

FIGURE 3 is a sectional side elevational view of the master valve made in accordance with this invention.

FIGURE 4 is a similar view of the sprinkler valve also made in accordance with this invention.

FIGURE 5 is a sectional end view taken approximately along the line 5—5 of FIGURE 4.

FIGURE 6 is a fragmentary top plan view of FIGURE 5 with the sprinkler head removed.

FIGURE 7 is a front view on an enlarged scale of two water outlets, a ball valve for alternate cooperation with the outlets, and ball valve operating means.

Figure 1:
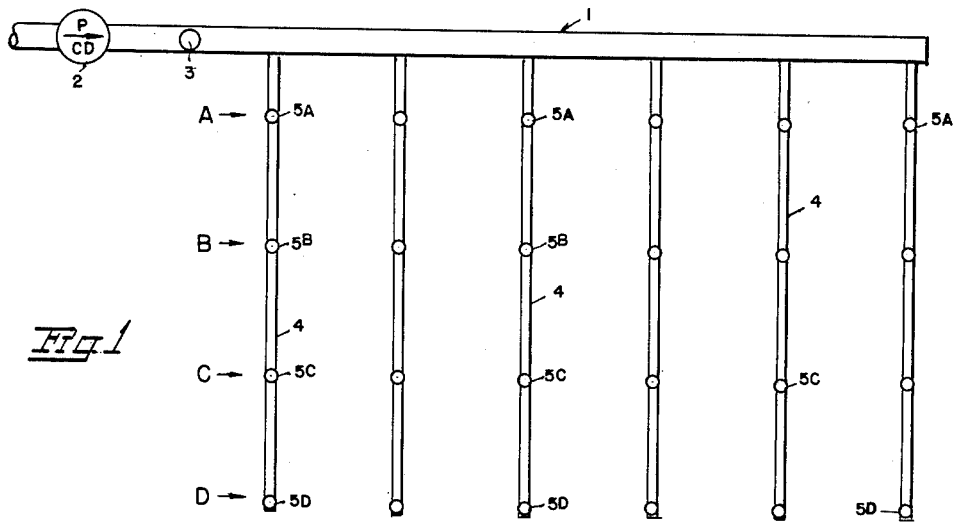
FIGURE 1 is a diagrammatic view of a sprinkler system equipped with and controlled by a master valve and water distributing control valves, hereinafter sometimes referred to as "sprinkler valves," all made in accordance with my invention.
Figure 2:
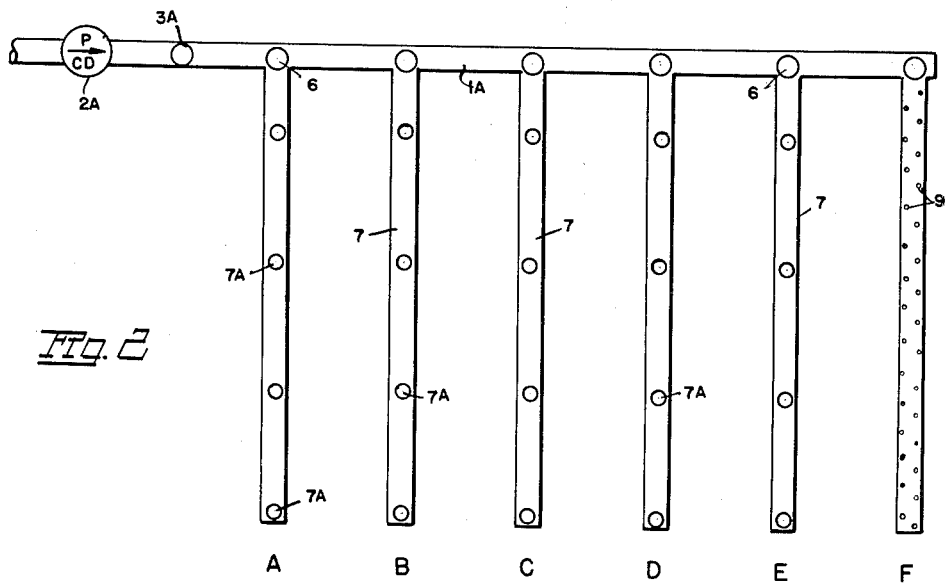
FIGURE 2 is a similar view of a sprinkler system embodying any suitable type of sprinkler valves and controlled by the master valve and by a modification of sprinkler valves of this invention.

With continuing reference to the drawings, wherein like reference characters designate like parts, and particularly FIGURES 1 and 2 thereof, reference numeral 1 indicates generally a main water line of a sprinkler system supplied with water under pressure from a delivery pump 2 and controlled by the master valve 3.

A plurality of lateral pipes 4 are in open communication at one of their ends with the interior of the main line 1 and closed at their opposite ends by vented caps, to be more fully hereinafter described.

In FIGURE 2, a series of valves 6, to be more fully hereinafter described, are in communication with each other and with the delivery pump 2A by means of the main line 1A and master valve 3A which is identical with the valves 6. Also in communication at one of their ends with the line 1A through the valves 6 is a series of lateral pipes 7, provided with any suitable type of sprinkler heads 7A and sealed at their opposite ends. If desired, the sprinkler heads may be dispensed with by providing the laterals with orifices as indicated at 9.

The master valve, as illustrated in FIGURE 3, comprises a hollow body member 8, closed at its top end by a spring housing 9A and having an inlet 10, and outlet 11, and a bypass or discharge opening 12. The valve body is connected into the main line 1 or 1A by its inlet and outlet. The inner ends of the openings 11 and 12 terminate in valve seats 13 and 14, respectively, for alternate cooperation with a ball valve 15 (see also FIGURE 7) provided with a pin 16 extending therethrough and thereby yieldingly connected by tension springs 17 and 18 to the legs 19 of a yoke indicated generally at 20 and offset at its bottom end as shown in FIGURES 3 and 4. The top end of the yoke is secured to or integrated with a stem 21 slidably extending as at 22 through the base of the housing 9A and terminating in a squared top end portion slidable in a slide bearing 23 integrated with a closure cap 24 for the housing 9A. Disposed within this housing and surrounding the stem 21 is a compression spring 25 whose one end bears against the underside of the closure cap and whose opposite end bears against a cup piston 26 operable within the housing 9A and whose skirt portion 27, upon completion of the downstroke of the piston, is protected against collapse by a suitable washer 28.

From the foregoing, and with the ball valve 15 sealing off the discharge opening 12 as shown in FIGURE 3, it will be apparent that water in the main line under pressure will flow freely through the inlet 10 and through the outlet 11.

All the sprinkler valves 5 in FIGURE 1 are identical and, as illustrated in detail in FIGURE 4, each comprises a main body, indicated generally at 30, having an inlet 31 and an outlet 32 both in open communication with its hollow interior 34. A second outlet 33 is also in communication with the hollow interior of the valve body through a chamber 33A. Each valve body 30 is connected into open communication with its respective lateral pipe 4 by means of the body inlet 31 and outlet 32. The inner ends of outlets 32 and 33 are provided respectively with valve seats 13A and 14A. The ball valve 15A is yieldingly connected to the legs 19A of the yoke 20A in the same manner as described in FIGURE 7. The top end of the hollow body 30 is closed by the base 35 of a cylinder 35A closed at its top end by the base portion 36 of a sprinkler head supporting bracket indicated generally at 37. The yoke 20A is provided or integrated with a vertical stem 21A slidably extending upwardly through the cylinder and base portion 36 of the bracket 37, and is pivotally connected as at 38 to one end of an arm 39 whose opposite end is pivotally connected to a crank-pin 40 carried by one end of a crank 41 whose opposite end is secured in any approved manner to a rocker shaft 42. One outer end of the pin 40 is interconnected with the base portion 36 of the bracket 37 by a tension spring 43 by means of a bracket 44 whereby the ball valve 15A is at all times urged toward the valve seat 13A at the inner end of the outlet 32. Secured to the stem 21A and operable within the cylinder 35A is a cup piston 45 whose skirt portion 45A is protected against collapse at the end of the downstroke of the piston by a washer 46. The interior of the cylinder 35A below the piston 45 is in open communication by means of an orifice 47 with a duct 48 opening into the chamber 33A. This bottom end of the cylinder 35A is also in communication with a timer element in the form of a bleeder vent 50 from which regulated escapement of water through an outlet port 51 is controlled by a valve screw 52. The vertical jet of water escaping from the port 51 during the downstroke of piston 45 passes through an aligned opening 51A in the base 36 of the bracket 37 and is finally broken up by a baffle plate 51B on the rocker shaft 42 to prevent puddling of water on the ground around the sprinkler valve.

The rocker shaft 42 is pivotally mounted at one of its ends as at 54 in one arm 55 of the bracket 37. The opposite end of the rocker shaft is secured to the closed end 56 of a cylinder 57 whose interior is in communication by means of a water conduit 58 with the interior of the chamber 33A. In open communication with the interior of the cylinder 57 by means of an opening 59 therein is one end of an arcuate sprinkler head, indicated generally at 60, and provided with any desired number of water escapement orifices 61 spaced apart throughout its length. The opposite end of the sprinkler head is secured as at 62 in any approved manner to said one end of the rocker shaft 42. The end of the conduit 58 on the interior of the cylinder 57 terminates in a point 58A (see FIGURE 6) to restrict the flow of water through the opening 59 and hence to the sprinkler head when the latter is crossing the zenith of its swing from one side to the other (see FIGURE 5).

From the foregoing and with the parts of each of the sprinkler valves in a row A in FIGURE 1 in the positions shown in FIGURE 4, water entering the hollow interior 34 of the valve housing 30 through inlet 31 will be directed through chamber 33A into outlet 33, through conduit 58 to the interior of the cylinder 57, out through the opening 59, across the sprinkler head 60, and out through the orifices therein to start the sprinkling cycle. At the same time, water under pressure from within the chamber 33A and conduit 58 will enter the cylinder 35A through duct 48 and orifice 47 beneath the piston 45, and because of this volumetric preponderance of pressure, and negligible dissipation of water out through the timer valve, the piston will be moved upwardly to thereby swing the rocker shaft 42 and hence the sprinkler head 60 in an arc through 90 degrees, as shown in full and broken lines in FIGURE 5, against the resistance of the tension spring 43 to complete the sprinkling cycle which starts when the piston starts its up stroke and stops when the piston reaches the top of its stroke. The rate of upward travel of the piston and hence the sprinkling time interval is determined by the controlled leakage from the bleeder valve 52. For example, if the bleeder valve were set in a wide open position, the piston would rise slowly because of the reduction in pressure. If the bleeder valve were closed, the piston would travel rapidly to the top of its stroke. Conversely, the return of the piston to the bottom of its down stroke is also determined by the setting of the bleeder valve 52. As the piston 45 approaches the top of its stroke, the inwardly turned bottom ends 65 of the legs of the yoke 20 will engage the ends of the pin 16 and thereby unseat the ball valve 15A from the seat 13A in the outlet 32. The resultant gradually increasing tension load on the springs 17 and 18 will finally snap the ball valve from the seat 13A onto the seat 14A, which will, of course, stop the flow of water to the sprinkler head 60.

The operation of the invention in the sprinkling system of FIGURE 1 is as follows:

Water from its source is delivered under pressure to the main line 1 and into the master valve 3 by the delivery pump 2 and from the outlet 11 of the master valve throughout the length of the main line therebeyond. Water pressure from the main line is delivered by the lateral pipes 4 to the inlet 31 of each of the sprinkler valves 5A in the first row paralleling the main line and designated at A. Each of these valves with their parts in the position shown in FIGURE 4 will function simultaneously in the manner previously described. Upon completion of their sprinkling cycle and the resultant opening of the outlets 32 by the ball valves 15A now being seated in the valve seats 14A, water pressure will flow from the outlets 32 to the inlets of the valves 5B in row B and so on to the inlets of the valves 5D in the last row D, which will conclude the sequential sprinkling operation from row A to row D. The outlets 32 of the valves in row D are closed by a vented cap 67, as shown applied in FIGURE 4, in order to set up a back pressure through the lateral pipes 4, main line 1 and within the hollow body 8 of the master valve 3. This pressure within hollow valve body 8 will enter the spring housing 9A through a check valved port 9B and orifice 9C and force the piston 26 and yoke 20 upwardly against the resistance of the spring 25, and in so doing will cause the springs 17 and 18 to snap the ball valve 15 from the valve seat 14 to the valve seat 13 and thereby cut off the water supply to the sprinkling system. Any residual water between the pump and the master valve will then drain to the ground through the discharge opening 12 which is of sufficient flow capacity to materially reduce the fluid pressure in the chamber of the hollow body 8 so that spring 25 may return piston 26 to its initial lowered position at a relatively slow rate of movement controlled by the rate of fluid flow from the spring housing 9A through the orifice 9C.

As the yoke 20 approaches its lowermost position (FIGURES 3 and 7), springs 17 and 18 are progressively tautened until they overcome the residual water pressure in the chamber of the hollow body 8 and snap the ball 15 from the valve seat 13 to the valve seat 14, whereupon the fluid is again directed into the sprinkling system.

During the period of time between the seating of ball 15 with valve seat 13 and its return to valve seat 14, fluid supply is cut off from the lateral pipes 4 wherein the pressure has dropped by reason of the fact that the ends of the lateral pipes are vented through the cap 67 of the terminal sprinkler valves 5D. This loss of pressure permits the springs 43 of the sprinkler valves to return the balls 15A to the valve seats 13A prior to the seating of ball 15 with valve seat 14. The system is therefore fully and automatically reset for a successive cycle.

In the operation of the sprinkling system of FIGURE 2 water under pressure from the delivery pump 2A and master valve 3A passes through inlets and outlets of the valves 6 progressively along the main line 1A. These valves 6 are identical in structure and function with those indicated at 5A—5D in FIGURE 1 and shown in detail in FIGURE 4, except that the sprinkler head 60 and its related parts have been removed, the cylinder 35A has been closed by any suitable cylinder head and the water conduit 58 is directed into its respective lateral pipe 7. By this arrangement water pressure will flow from the first valve 6 in the main line 1A into the first lateral pipe indicated at A and out through the sprinkler heads 7 therein. The duration of this sprinkling cycle will be determined by the upward movement of the piston 45 in lifting the ball valve 15A from the seat 13A to the seat 14A and the spring urged downward movement of the piston regulated by the rate of controlled escapement of water from the cylinder beneath the piston out through the port 51. The back pressure finally set up within the main line 1A by the vented cap 17 on the outlet 32 of the last valve in the main line will, of course, as previously described, actuate the master valve into an inoperative condition to conclude the sprinkling operation.

While I have shown particular forms of embodiment of my invention, I am aware that many minor changes therein will readily suggest themselves to others skilled in the art without departing from the spirit and scope of the invention. Having thus described by invention, what

I claim as new and desire to protect by Letters Patent is:

In a pressurized water distribution system including a water supply line under pressure from a source and a plurality of lateral branch lines in communication at one of their ends with said main lines; the improvement comprising a pressure sensitive flow interrupting control valve having a hollow valve body, said body having an inlet connected to said water supply line, said body having an outlet provided with a valve seat and connected to said branch lines, said body having a discharge opening, provided with a valve seat, a ball valve within said housing and adapted for alternate valving cooperation with said valve seats for alternately directing water received from said source to said branch lines and to said discharge opening, said ball being arranged relative to the seats so as to be constantly urged against the seat with which it cooperates, fluid pressure responsive motor means, a restricted passage connecting the interior of the hollow valve body with the motor means in such a manner as to move the motor means in one direction in response to pressure in the branch line outlet, means urging said motor means in a direction opposite to said one direction, a delayed motion resilient connector means interconnecting said motor means and said ball for alternately and successively shifting said ball valve into valving cooperation with said valve seats, said connector means comprising a yoke having a top end and a bottom end and connected at its top end to said motor means and yieldingly connected near its bottom end to said ball valve, the motor, ball and connector means being so arranged relative to the seats that when the motor means moves in said one direction the connector means will urge the ball away from the discharge opening seat and toward the branch line outlet seat, whereby when said discharge opening is closed by said ball, water will flow from said inlet through said outlet and in to said branch lines and whereby water under back pressure from said outlet will actuate said motor means to apply and gradually increase the tension on said yielding connection of said ball valve to said yoke to snap the ball valve from said discharge opening to said outlet to thereby seal off the outlet opening and thereby permit bypass of water from said inlet out through said discharge opening.

References Cited in the file of this patent

UNITED STATES PATENTS

| | | |
|---|---|---|
| 1,593,125 | Jackley | July 20, 1926 |
| 1,745,536 | Gresham | Feb. 4, 1930 |
| 1,859,357 | Elder | May 24, 1932 |
| 1,901,496 | Elder | Mar. 14, 1933 |
| 2,921,629 | Stout | Jan. 19, 1960 |